United States Patent
Kasaraneni et al.

(10) Patent No.: US 12,556,830 B2
(45) Date of Patent: Feb. 17, 2026

(54) APPARATUS AND METHOD FOR SEAMLESS VIDEO CAPTURE DURING FLEX-STATE TRANSITION

(71) Applicant: SAMSUNG ELECTRONICS CO., LTD., Suwon-si (KR)

(72) Inventors: Sai Hemanth Kasaraneni, Noida (IN); Nitin Jain, Noida (IN); Gunit Anand, Noida (IN); Chhavi Yadav, Noida (IN); Baljeet Kumar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/799,784

(22) Filed: Aug. 9, 2024

(65) Prior Publication Data
US 2025/0056132 A1 Feb. 13, 2025

(30) Foreign Application Priority Data

Aug. 11, 2023 (IN) .............................. 202311054150

(51) Int. Cl.
*H04N 23/90* (2023.01)
*G06T 7/246* (2017.01)
(Continued)

(52) U.S. Cl.
CPC ............ *H04N 23/90* (2023.01); *G06T 7/246* (2017.01); *G06V 10/40* (2022.01); *G06V 10/70* (2022.01);
(Continued)

(58) Field of Classification Search
CPC ........ H04N 23/90; H04N 23/50; H04N 23/62; H04N 23/6812; H04N 23/683;
(Continued)

(56) References Cited

U.S. PATENT DOCUMENTS

| | | | |
|---|---|---|---|
| 8,830,319 B2 | 9/2014 | Stegmann et al. | |
| 9,185,291 B1 | 11/2015 | Shabtay et al. | |

(Continued)

FOREIGN PATENT DOCUMENTS

| | | |
|---|---|---|
| CN | 112799522 A | 5/2021 |
| CN | 114070995 A | 2/2022 |

(Continued)

OTHER PUBLICATIONS

Blackard, "How Samsung Foldables Are Changing the Way We Use Our Smartphones," Samsung Global Newsroom, 2024, (8 total pages).

(Continued)

*Primary Examiner* — Mekonnen D Dagnew
(74) *Attorney, Agent, or Firm* — Sughrue Mion, PLLC

(57) ABSTRACT

A method for seamless video capture during flex-state transition in a foldable device includes identifying, by one or more sensors of the foldable device, an initiation of a flex movement of the foldable device based on a plurality of frames of a video being captured by a source camera from among one or more cameras of the foldable device; extracting, based on the identifying of the initiation of the flex movement, a semantic scene from the plurality of frames to determine one or more regions of interest (ROIs) in the semantic scene; determining an optical flow for each of the one or more ROIs; determining a flex trajectory of the foldable device; determining a target camera from among the one or more cameras; determining a transition period to switch to the target camera; and switching capturing of the plurality of frames from the source camera to the target camera.

20 Claims, 17 Drawing Sheets

(51) Int. Cl.
*G06V 10/40* (2022.01)
*G06V 10/70* (2022.01)
*G06V 20/50* (2022.01)
*H04N 23/50* (2023.01)
*H04N 23/62* (2023.01)
*H04N 23/68* (2023.01)

(52) U.S. Cl.
CPC ............. *G06V 20/50* (2022.01); *H04N 23/50* (2023.01); *H04N 23/62* (2023.01); *H04N 23/6812* (2023.01); *H04N 23/683* (2023.01); *G06T 2207/10016* (2013.01); *G06T 2207/20212* (2013.01); *G06T 2207/30196* (2013.01); *G06T 2207/30241* (2013.01)

(58) Field of Classification Search
CPC ........... G06T 7/246; G06T 2207/10016; G06T 2207/20212; G06T 2207/30196; G06T 2207/30241; G06V 10/40; G06V 10/70; G06V 20/50
See application file for complete search history.

(56) References Cited

U.S. PATENT DOCUMENTS

| | | | |
|---|---|---|---|
| 10,156,706 B2 * | 12/2018 | Shabtay | ................. H04N 23/55 |
| 11,029,907 B2 | 6/2021 | Myung et al. | |
| 11,061,213 B2 * | 7/2021 | Yao | ..................... H04N 23/687 |
| 11,243,455 B2 * | 2/2022 | Mireault | ............ G02B 13/0065 |
| 11,457,151 B2 | 9/2022 | An | |
| 2013/0322767 A1 | 12/2013 | Chao et al. | |
| 2021/0096337 A1 * | 4/2021 | Yang | ................. G02B 13/0065 |
| 2022/0286550 A1 | 9/2022 | Jia | |
| 2022/0303473 A1 | 9/2022 | Sung et al. | |
| 2022/0303476 A1 | 9/2022 | Jang et al. | |
| 2023/0044497 A1 | 2/2023 | Zhang et al. | |
| 2023/0046377 A1 | 2/2023 | Yeo et al. | |

FOREIGN PATENT DOCUMENTS

| | | |
|---|---|---|
| CN | 111654629 B | 6/2022 |
| KR | 10-2021-0072351 A | 6/2021 |
| KR | 10-2270681 B1 | 6/2021 |
| KR | 10-2022-0033247 A | 3/2022 |
| WO | 2021/162295 A1 | 8/2021 |
| WO | 2022/097930 A1 | 5/2022 |

OTHER PUBLICATIONS

International Search Report and Written Opinion (PCT/ISA/210 and PCT/ISA/237) dated Nov. 12, 2024, issued by International Searching Authority for International Application No. PCT/KR2024/011913.

* cited by examiner

APPARATUS AND METHOD FOR SEAMLESS VIDEO CAPTURE DURING FLEX-STATE TRANSITION

CROSS-REFERENCE TO RELATED APPLICATIONS

This application claims benefit of priority under 35 U.S.C. § 119 to Indian Patent Application No. 202311054150, filed on Aug. 11, 2023, in the Indian Patent Office, the disclosure of which is incorporated by reference herein in its entirety.

BACKGROUND

1. Field

The disclosure relates generally to flexible display devices, and more particularly, to an apparatus and a method for seamless video capture during a flex-state transition of a foldable device.

2. Description of Related Art

Popularity of flexible display devices may be increasing in part due to their screen technology and/or versatile design. Flexible display devices may refer to devices that may feature a screen that may bend and/or fold. Consequently, the flexible display devices may be convenient to be carried and/or used in various situations. However, the flexible display devices may also pose some challenges. For example, integration of cameras in the flexible display devices may be difficult. That is, cameras integrated in the flexible display devices may exhibit issues such as, but not limited to, unstable footage, video discontinuity, and the like. As used herein, unstable footage may refer to video recording being affected by the hand movements of a user, in particular when the user bends and/or folds a flexible device. For example, the unstable footage may result in a destabilization of a live video stream. Video discontinuity may refer to video recording being interrupted and/or distorted when the user bends and/or folds the flexible device. For example, the video discontinuity may result in a change in camera properties, in capturing of unwanted subjects, and/or in abrupt stopping of the recording.

FIG. 1 illustrates an example depicting the recording of live video on a flexible device. As shown in FIG. 1, the flexible device may be recording the live video from a front camera, and while recording the live video, the flexible device may change its flex state and/or configuration. As used herein, changes in the flex state may refer to changes in the physical state of the flexible device such as, but not limited to, from a folded state to an unfolded state and vice versa. In some examples, when the flex-state transition is performed on the flexible device, there may be an abrupt termination of the live video being recorded.

In such examples, the live video recording may be abruptly interrupted because the flexible device may not be able to switch to the appropriate camera during the flex-state transition. For example, the flexible device may be unable to identify a target camera after the flex-state transition, and as such, live video recording may stop abruptly. Moreover, the camera may capture unwanted people in the background, potentially violating their privacy. Furthermore, the motion of the device may cause instability in the video quality, which may affect the user experience. These issues may be hard to address with simple stabilization algorithms.

Therefore, there is a need for an improved method and apparatus that may stabilize the video footage and may resume the video recording seamlessly when the flexible device changes its flex state.

SUMMARY

Provided are an apparatus and a method for seamless video capture during a flex-state transition of a foldable device.

Additional aspects will be set forth in part in the description which follows and, in part, will be apparent from the description, or may be learned by practice of the presented embodiments.

According to an aspect of the disclosure, a method for seamless video capture during flex-state transition in a foldable device includes identifying, by one or more sensors of the foldable device, an initiation of a flex movement of the foldable device based on a plurality of frames of a video being captured by a source camera from among one or more cameras of the foldable device; extracting, based on the identifying of the initiation of the flex movement, a semantic scene from the plurality of frames of the video to determine one or more regions of interest (ROIs) in the semantic scene; determining an optical flow for each of the one or more ROIs, each of the optical flows encoding a natural motion of a corresponding ROI of the one or more ROIs in subsequent frames of the plurality of frames; determining a flex trajectory of the foldable device by forecasting an orientation of the foldable device with respect to the flex movement; determining a target camera from among the one or more cameras of the foldable device, based on the optical flows and the flex trajectory of the foldable device; determining a transition period to switch to the target camera; and switching capturing of the plurality of frames from the source camera to the target camera, based on the transition period.

According to an aspect of the disclosure, a foldable device includes one or more sensors configured to identify an initiation of a flex movement of the foldable device based on a plurality of frames of a video being captured by a source camera from among one or more cameras of the foldable device; a memory storing instructions; and one or more processors communicatively coupled to the memory, wherein the one or more processors are configured to execute the instructions to extract, based on identification of the initiation of the flex movement, a semantic scene in the plurality of frames of the video to determine one or more ROIs in the semantic scene; determine an optical flow for each of the one or more ROIs, each of the optical flows encoding a natural motion of a corresponding ROI of the one or more ROIs in subsequent frames of the plurality of frames; determine a flex trajectory of the foldable device by forecasting an orientation of the foldable device with respect to the flex movement; determine a target camera from among the one or more cameras of the foldable device, based on the optical flows and the flex trajectory of the foldable device; determine a transition period to switch to the target camera; and switch capturing of the plurality of frames from the source camera to the target camera based on the transition period.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
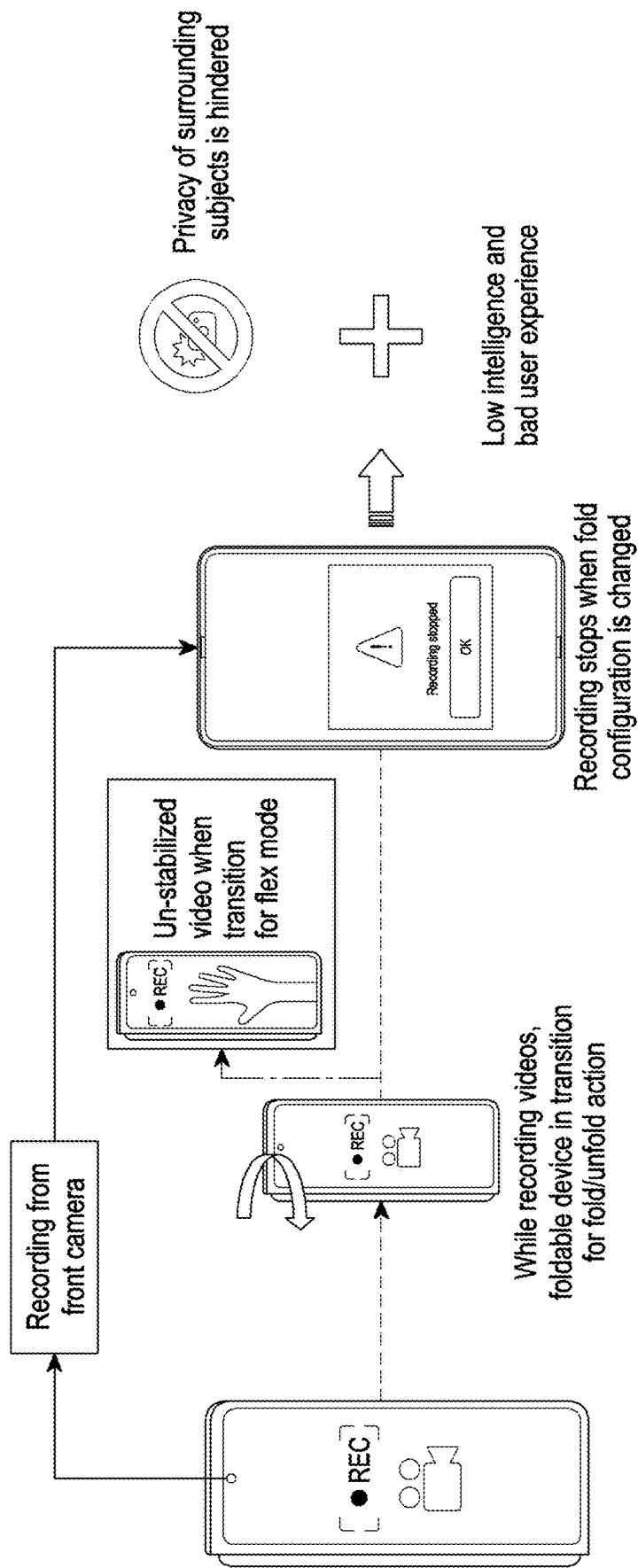
FIG. 1 illustrates an example depicting recording of live video on a flexible display device, according to the related art.

For the purpose of promoting an understanding of the principles of the disclosure, reference is made to the embodiments illustrated in the drawings and specific language may be used to describe the same. It is to be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It is to be understood by those skilled in the art that the foregoing general description and the following detailed description are explanatory of the disclosure and are not intended to be restrictive thereof.

Reference throughout this disclosure to "an aspect", "another aspect" or similar language may refer to a particular feature, structure, or characteristic described in connection with an embodiment that may be included in at least one embodiment of the disclosure. Thus, appearances of the phrase "in an embodiment", "in another embodiment", and similar language throughout the disclosure may, but may not necessarily, refer to the same embodiment.

The terms "comprise", "comprising", or any other variations thereof, are intended to cover a non-exclusive inclusion, such that a process and/or method that comprises a list of steps may not include only those steps but may include other steps not expressly listed or inherent to such process and/or method. Similarly, one or more devices or sub-systems or elements or structures or components preceded by "comprises . . . a" may not, without more constraints, preclude the existence of other devices or other sub-systems or other elements or other structures or other components or additional devices or additional sub-systems or additional elements or additional structures or additional components.

The embodiments described herein and the various features and advantageous details thereof are explained more fully with reference to the non-limiting embodiments that are illustrated in the accompanying drawings and detailed in the following description. Descriptions of well-known components and processing techniques may be omitted to not unnecessarily obscure the embodiments herein. Also, the various embodiments described herein may not be necessarily mutually exclusive, as some embodiments may be combined with one or more other embodiments to form new embodiments. The term "or" as used herein, refers to a non-exclusive or unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of modules that carry out a described function or functions. These modules, which may be referred to herein as units or blocks or the like, or may include blocks or units, may be physically implemented by analog and/or digital circuits such as, but not limited to, logic gates, integrated circuits, microprocessors, microcontrollers, memory circuits, passive electronic components, active electronic components, optical components, hard-wired circuits, or the like, and may optionally be driven by firmware and/or software. The circuits may, for example, be embodied in one or more semiconductor chips, and/or on substrate supports such as printed circuit boards and the like. The circuits constituting a block may be implemented by dedicated hardware, by a processor (e.g., one or more programmed microprocessors and associated circuitry), and/or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, and the like may be used herein to describe various elements, these elements should not be limited by these terms. These terms are generally only used to distinguish one element from another.

Further, skilled artisans may appreciate that the elements in the drawings are illustrated for simplicity and may not have necessarily been drawn to scale. For example, the flow charts illustrate the method in terms of the most prominent steps involved to help improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that may be readily apparent to those of ordinary skill in the art having the benefit of the description herein.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Embodiments will be described below in detail with reference to the accompanying drawings.

Figure 2:
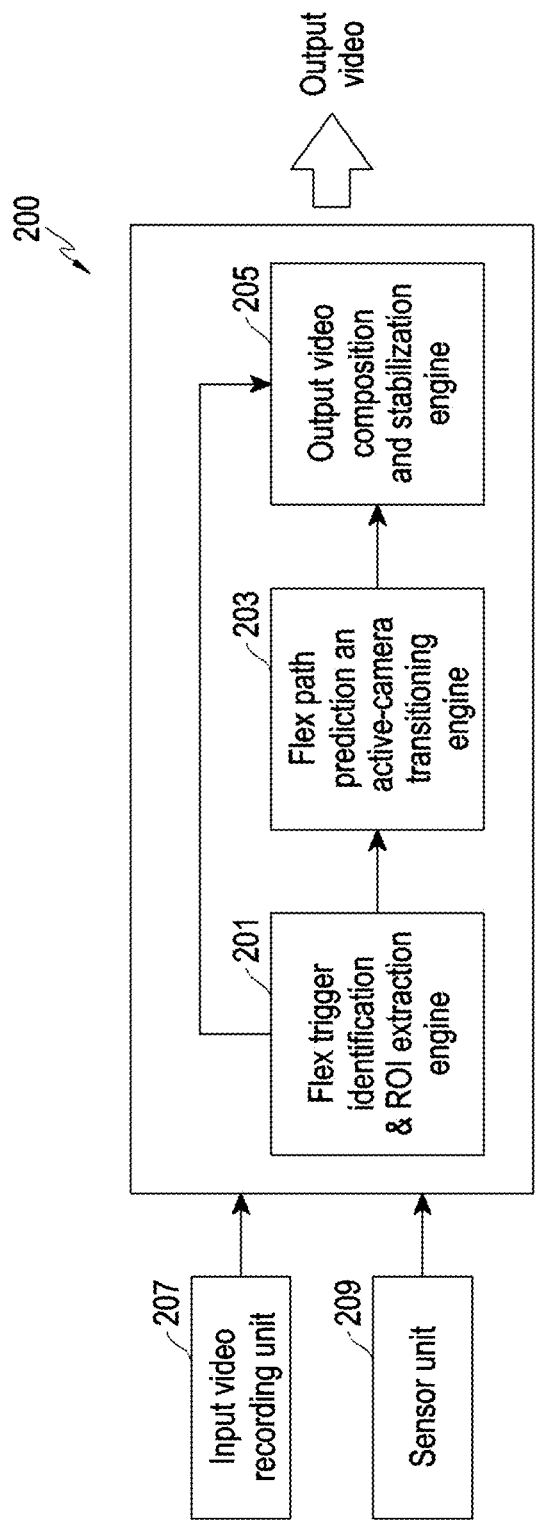
FIG. 2 illustrates a block diagram of a foldable device, according to one or more embodiments.

FIG. 2 illustrates a block diagram of a foldable device 200, according to one or more embodiments.

The foldable device 200 includes a flex trigger identification & regions of interest (ROI) extraction engine 201, a flex path prediction and active-camera transitioning engine 203, an output video composition and stabilization engine 205, an input video recording unit 207, and a sensor unit 209. The terms "foldable device", "foldable display device", and "flexible display device" may be used interchangeably herein.

The input video recording unit 207 includes one or more cameras configured to capture a plurality of frames of a video. The one or more cameras may include a front in-display camera, a front cover screen camera, and a rear camera.

The sensor unit 209 may be and/or may include one or more sensors configured to capture data associated with the foldable device 200. The one or more sensors may capture the data continuously, periodically at a predefined interval, and/or aperiodically at different time intervals. The data captured during a flex-state transition of the foldable device 200 is utilized to capture a seamless video from the one or more cameras. The flex-state transition of the foldable device 200 refers to the change in the physical state of the foldable device 200 such as, but not limited to, from a folded state to an unfolded state, from the unfolded state to the folded state, from an open state to a bent state, from the bent state to the open state, and others. The one or more sensors may include an accelerometer, a gyroscope, a Hall effect sensor, an ambient light sensor, and/or the like.

The flex trigger identification & ROI extraction engine 201 is configured to identify, based on accelerometer data and gyroscope data, an initiation of a flex movement of the foldable device 200 and determine a type of the flex movement. The initiation of the flex movement may refer to the initiation of the movement of the foldable device 200 for the flex-state transition. The flex trigger identification & ROI extraction engine 201 is further configured to extract a semantic scene in the plurality of frames of the video being captured to determine ROIs in the semantic scene. In some embodiments, the flex trigger identification & ROI extraction engine 201 is configured to determine optical flow for each of the ROIs which encodes the natural motion of the ROIs in subsequent one or more frames. The subsequent one or more frames refers to near-future frames subsequent to the plurality of frames after the initiation of the flex movement.

The flex path prediction and active-camera transitioning engine 203 is configured to determine a flex trajectory of the foldable device 200 by forecasting an orientation of the foldable device 200 with respect to the flex movement. The flex path prediction and active-camera transitioning engine 203 is further configured to determine a target camera to be switched to among the one or more cameras and a transition period based on the determined optical flow and the determined flex trajectory. In some embodiments, the flex path prediction and active-camera transitioning engine 203 is configured to switch to the target camera according to the optical flow for each of the ROIs in the determined transition period. In some embodiments, the flex path prediction and active-camera transitioning engine 203 is configured to consolidate captured data from each active camera of the one or more cameras. The captured data is the subsequent one or more frames captured by a source camera and the target camera captured after the initiation of the flex movement.

The output video composition and stabilization engine 205 is configured to integrate the consolidated captured data from each active camera to form a plurality of target frames. The output video composition and stabilization engine 205 is further configured to adjust the alignment of objects to optimize the stability of the video for a better user experience. For example, the output video composition and stabilization engine 205 may correct the position of each of the ROIs in the plurality of target frames to eliminate destabilization that is induced during the flex movement. The output video composition and stabilization engine 205 is further configured to identify a desirable transition effect based on a shifting of camera parameters, semantic context of the semantic scene being captured, and a user preference for transition effect type. The output video composition and stabilization engine 205 is further configured to composite a final frame by blending the identified transition effect in the transition period and consolidating each of the plurality of target frames to generate an output video.

Figure 3:
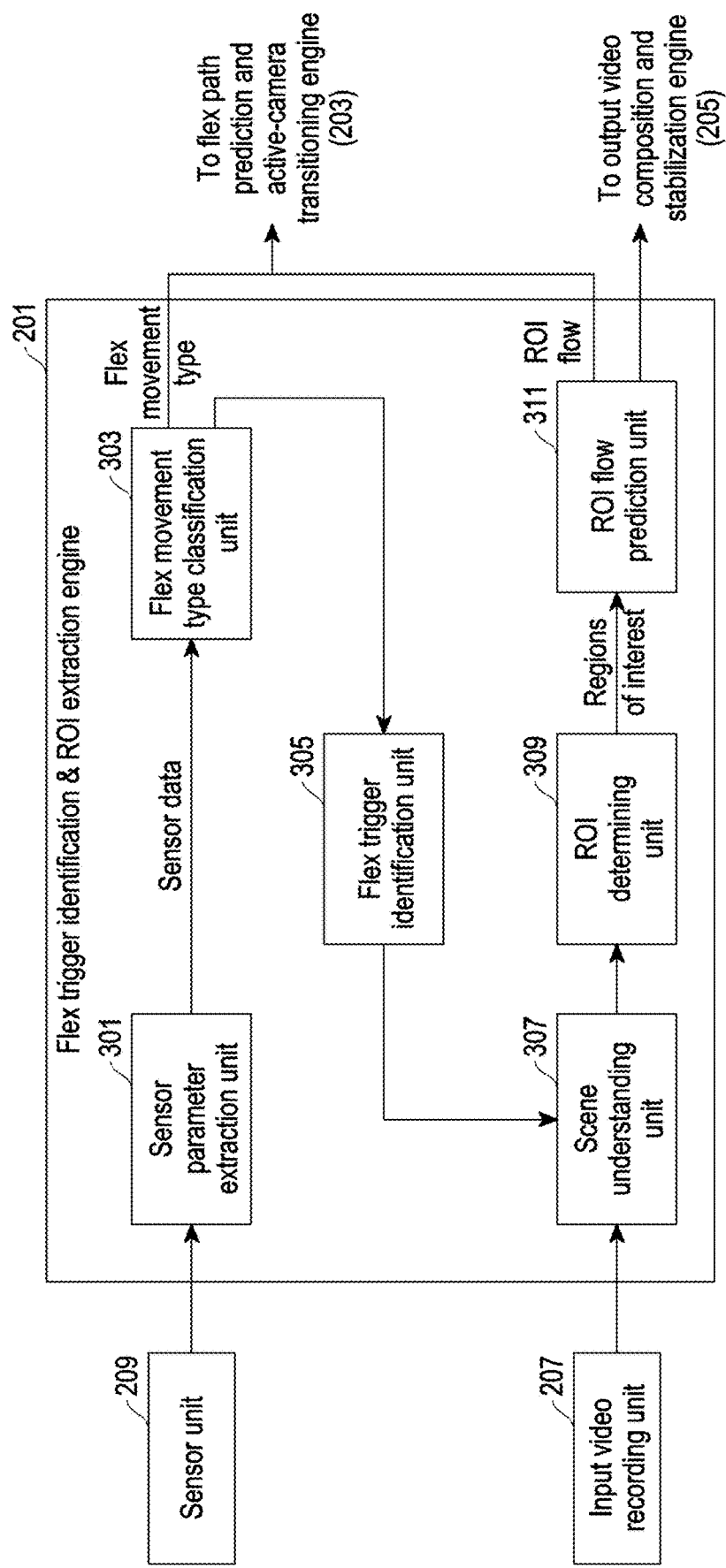
FIG. 3 illustrates a block diagram of a flex trigger identification & region of interest (ROI) extraction engine of the foldable device, according to one or more embodiments.

FIG. 3 illustrates a block diagram of the flex trigger identification & ROI extraction engine 201 of the foldable device 200, according to one or more embodiments.

The flex trigger identification & ROI extraction engine 201 includes a sensor parameter extraction unit 301, a flex movement type classification unit 303, a flex trigger identification unit 305, a scene understanding unit 307, an ROI determining unit 309, and an ROI flow prediction unit 311.

The sensor parameter extraction unit 301 receives the sensor data associated with the one or more sensors of the foldable device 200. The sensor parameter extraction unit 301 also receives information associated with a flex movement supported by the foldable device 200. The information associated with the flex movement includes information indicating whether the foldable device 200 supports the flex movement and types of the flex movement supported by the foldable device 200. The sensor data may include at least the gyroscope data from the gyroscope and the accelerometer data from the accelerometer.

The flex movement type classification unit 303 determines the type of the flex movement of the foldable device 200 based on the sensor data. The type of the flex movement includes at least one of folding, unfolding, rolling, flipping, and stretching of the foldable device 200. The flex movement type classification unit 303 outputs a probability score for each of the supported flex movements by using a first Machine Learning (ML) model. The first ML model may be and/or may include a deep convolutional neural network model. However, the disclosure is not limited in this regard, and the first ML model may be and/or may include other types of neural network models.

The flex trigger identification unit 305 identifies the initiation of the flex movement of the foldable device 200 while the plurality of frames of the video is being captured by the source camera of the one or more cameras of the foldable device 200. The flex trigger identification unit 305 may identify the initiation of the flex movement using data from the one or more sensors associated with the foldable device 200.

The scene understanding unit 307 extracts the semantic scene in the plurality of frames of the video being captured to determine the ROIs in the semantic scene. The scene understanding unit 307 may extract the semantic scene upon identification of the initiation of the flex movement. The ROI determining unit 309 determines the ROIs in the semantic scene. The ROIs may include at least one of one or more persons that are present in the semantic scene or one or more objects that are present in the semantic scene.

The ROI flow prediction unit 311 receives information of the ROIs in the semantic scene and determines the optical flow for each of the ROIs. The optical flow encodes natural motion of the ROIs in the subsequent one or more frames. For example, the ROI flow prediction unit 311 determines the optical flow based on the plurality of frames that are captured by the source camera before the initiation of the flex movement. The ROI flow prediction unit 311 determines the optical flow using a second ML model. The second ML model may be and/or may include a convolutional Long Short-Term Memory (LSTM) encoder-decoder network. However, the disclosure is not limited in this regard, and the second ML model may be and/or may include other types of neural network models.

The flex trigger identification & ROI extraction engine 201 outputs information of the determined optical flow and the type of the flex movement to the flex path prediction and active-camera transitioning engine 203 and the output video composition and stabilization engine 205.

Figure 4:
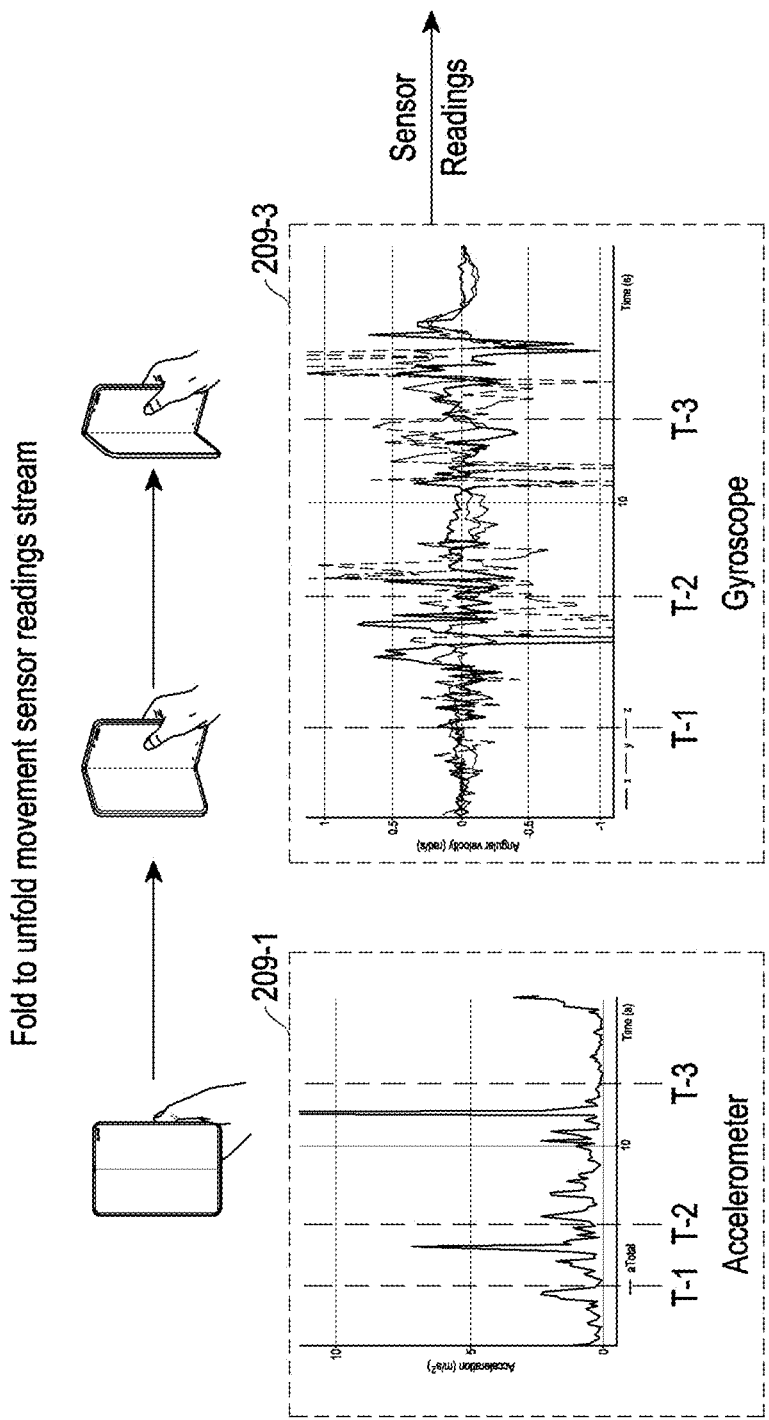
FIG. 4 illustrates an example of sensor data associated with one or more sensors of the foldable device obtained during a flex-state transition of the foldable device, according to one or more embodiments.

FIG. 4 illustrates an example of the sensor data associated with the one or more sensors of the foldable device 200 obtained during the flex-state transition of the foldable device 200, according to one or more embodiments. FIG. 4 shows accelerometer data 209-1 from an accelerometer of the sensor unit 209 and gyroscope data 209-3 from a gyroscope of the sensor unit 209 received by the sensor parameter extraction unit 301 during the transition from fold state to unfold state of the foldable device 200. T-1, T-2, and T-3 are different timestamps in the transition period. The different timestamps are further described with reference to FIG. 6.

Figure 5:
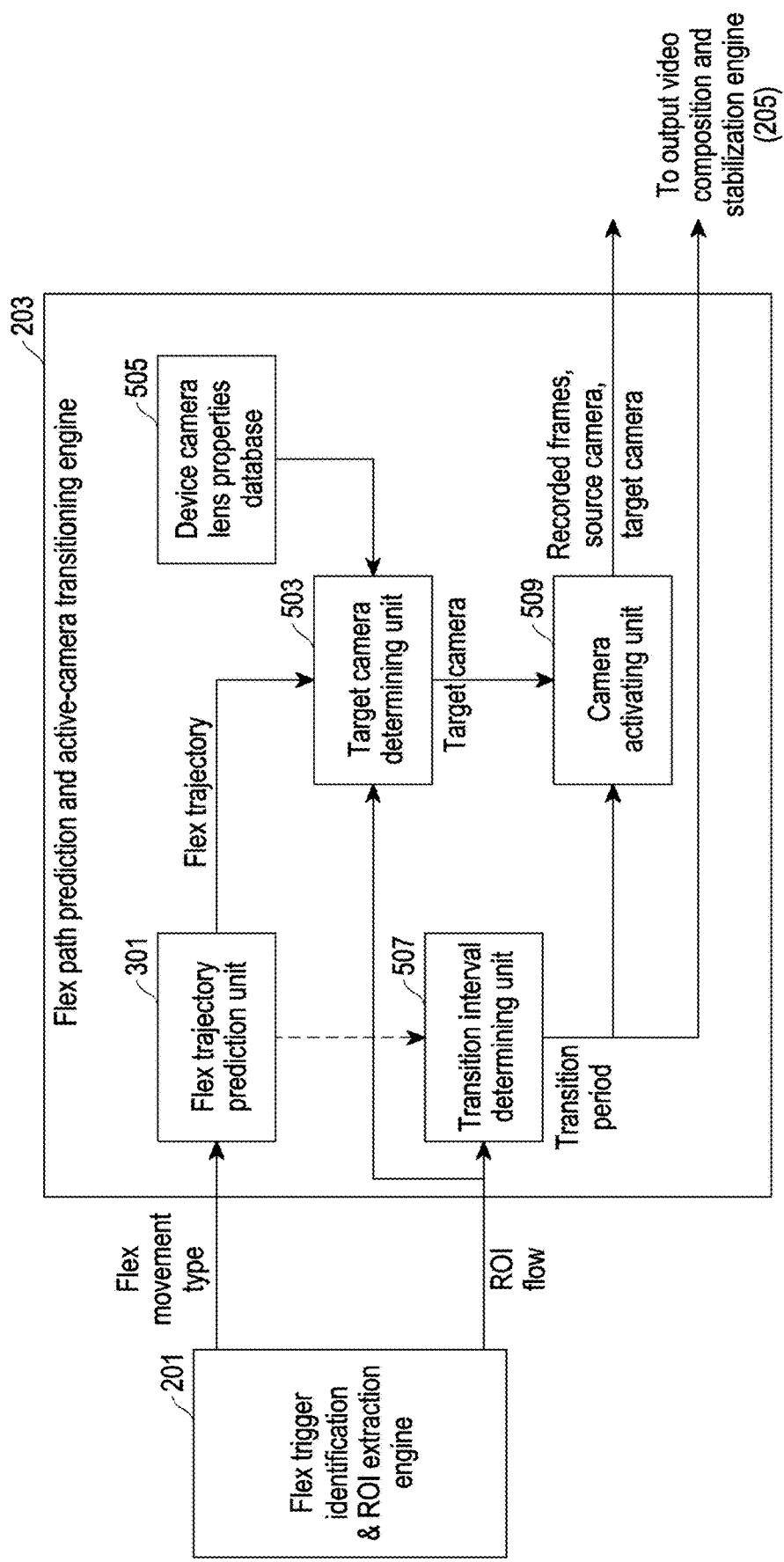
FIG. 5 illustrates a block diagram of a flex path prediction and active-camera transitioning engine of the foldable device, according to one or more embodiments.

FIG. 5 illustrates a block diagram of the flex path prediction and active-camera transitioning engine 203 of the foldable device 200, according to one or more embodiments.

The flex path prediction and active-camera transitioning engine 203 include a flex trajectory prediction unit 501, a target camera determining unit 503, a device camera lens properties database 505, a transition interval determining unit 507, and a camera activating unit 509.

The flex trajectory prediction unit 501 receives information on the type of the flex movement from the flex trigger identification & ROI extraction engine 201. The flex trajectory prediction unit 501 further determines the flex trajectory of the foldable device 200 by forecasting the orientation of the foldable device 200 with respect to the flex movement. For example, the flex trajectory prediction unit 501 forecasts the orientation of the foldable device 200 based on past orientation data (e.g., the gyroscope data 209-3) and the determined type of the flex movement. Thereafter, the flex trajectory prediction unit 501 determines the flex trajectory of the foldable device 200 based on the forecasted orientation. The flex trajectory prediction unit 501 may forecast the orientation using a third ML model. The third ML model may be and/or may include the LSTM model. However, the disclosure is not limited in this regard, and the third ML model may be and/or may include other types of neural network models.

The LSTM model forecasts time series sensor data based on past instances of the sensor data. The LSTM model learns the temporal patterns in the sequential data. The LSTM model is pre-trained on the gyroscope data extracted during flex-state transitions.

The target camera determining unit 503 receives the flex trajectory from the flex trajectory prediction unit 501 and information on the optical flow from the flex trigger identification & ROI extraction engine 201. The target camera determining unit 503 further determines the target camera among the one or more cameras based on the determined optical flow and the determined flex trajectory. The target camera determining unit 503 may receive information associated with positions of the one or more cameras from the device camera lens properties database 505. The positions of the one or more cameras refer to a mounting position of the one or more cameras on the foldable device 200. The target camera determining unit 503 may further determine a final device orientation of the foldable device 200 when the flex-state transition gets completed. In some embodiments, the target camera determining unit 503 may determine the target camera that has a line of sight equal to a predetermined line of sight at the final device orientation. The predetermined line of sight may be an X percent line of sight at the final device orientation, where X is a positive value between 0 and 1 (inclusive). The target camera determining unit 503 may determine the target camera based on the determined optical flow and the received information.

The transition interval determining unit 507 receives the flex trajectory from the flex trajectory prediction unit 501 and the information of the optical flow from the flex trigger identification & ROI extraction engine 201. The transition interval determining unit 507 further determines a transition period to switch to the target camera. The camera activating unit 509 switches from displaying at least one frame captured by the source camera to displaying at least one frame captured by the target camera based on the determined transition period. The determination of the transition period is further described with reference to FIGS. 6 to 8.

The flex path prediction and active-camera transitioning engine 203 output information of the determined transition period, recorded frames, the source camera, and the target camera to the output video composition and stabilization engine 205. The recorded frames are the subsequent one or more frames recorded in the transition period.

Figure 6:
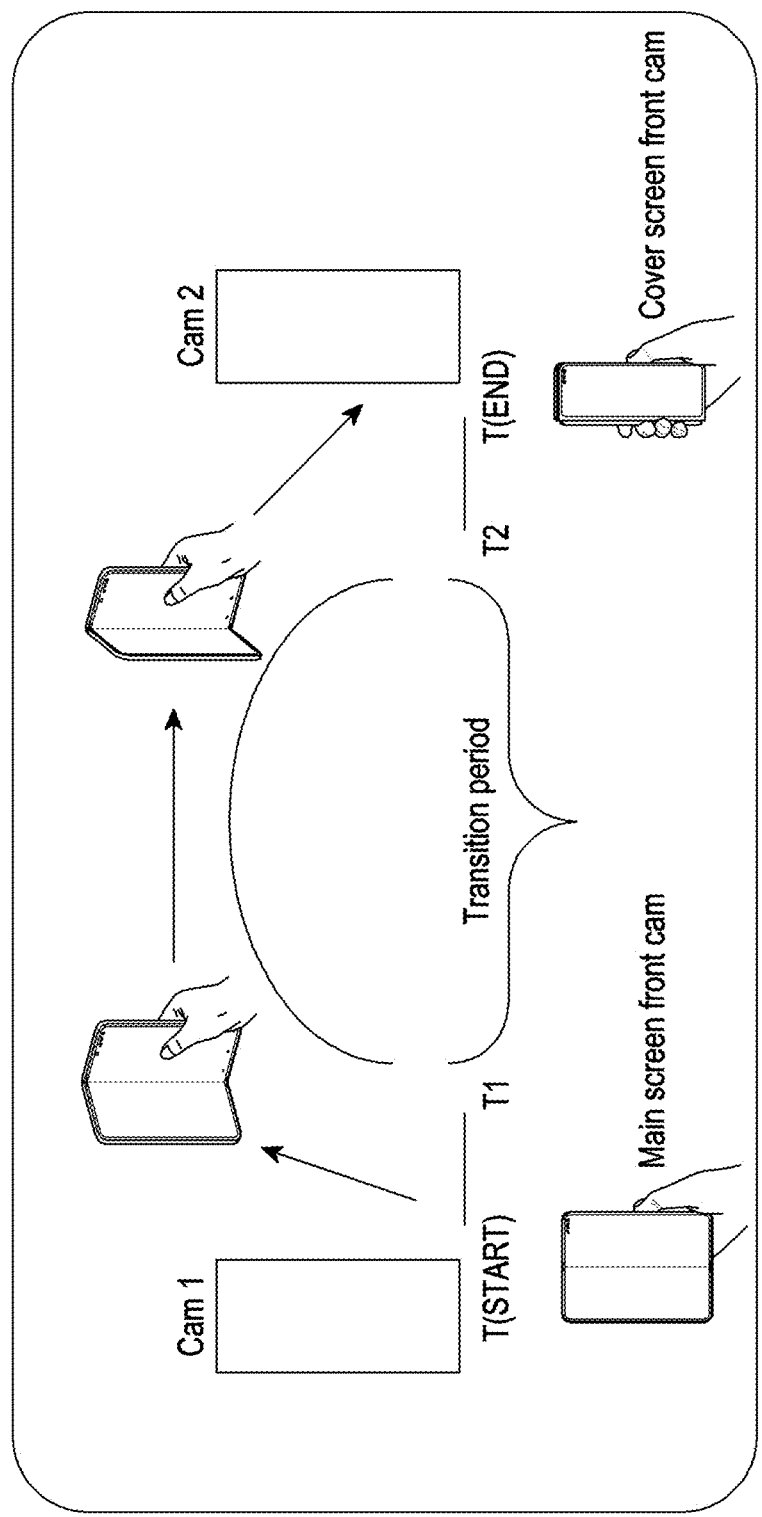
FIG. 6 illustrates an example of a transition period in a folding operation of the foldable device, according to one or more embodiments.

FIG. 6 illustrates an example of the transition period in a folding operation of the foldable device 200, according to one or more embodiments. FIG. 6 shows the flex-state transition of the foldable device 200 from the unfolded state to the folded state. The video is captured by the main screen front camera (e.g., source camera). At a time T (e.g., a start time), the flex-state transition from the unfolded state is identified. At this point, the video is being captured by the source camera. At time T1, the line of sight disappears on the source camera. At time T2, the line of sight appears on a cover screen front camera (e.g., target camera). At the time T2, the foldable device 200 switches from displaying at least one frame captured by the source camera to displaying at least one frame captured by the target camera to the target camera. From the time T2, the video capturing starts with the target camera. At time T (e.g., an end time), the foldable device 200 reaches the folded state, and video capturing continues from the target camera. Between the time T1 and the time T2, no camera has a line of sight, and this period refers to the transition period.

Figure 7:
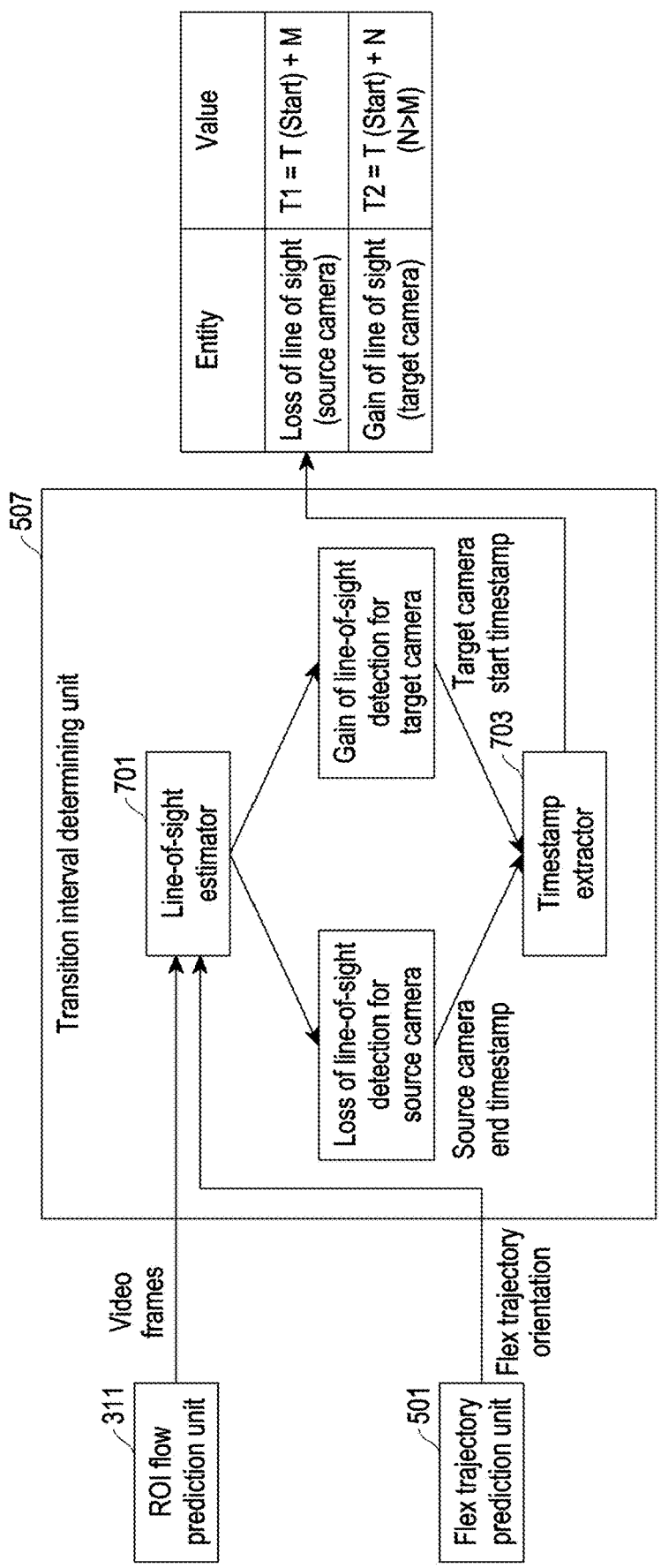
FIG. 7 illustrates a first method for determining a transition period of the foldable device, according to one or more embodiments.

FIG. 7 illustrates a first method for determining a transition period of the foldable device 200, according to one or more embodiments.

According to the first method, the transition interval determining unit 507 includes a line of sight estimator 701 and a timestamp extractor 703. The line of sight estimator 701 receives input from the ROI flow prediction unit 311 and the flex trajectory prediction unit 501. In some embodiments, the line of sight estimator 701 detects the line of sight for the source camera and the line of sight for the target camera based on the determined optical flow and the determined flex trajectory.

For example, the line of sight estimator 701 detects a loss of the line of sight for the source camera and a gain of the line of sight for the target camera. The timestamp extractor 703 determines a first timestamp T1 at which the loss of the line of sight is detected and a second timestamp T2 at which the gain of the line of sight is detected. For example, as shown in FIG. 7, the first timestamp T1 may be equal to the start time plus a time M corresponding to an amount of time after the start time that the loss of the line of sight is detected (e.g., T1=T(Start)+M), where M is a positive value greater than or equal to zero (0). As further shown in FIG. 7, the second timestamp T2 may be equal to the start time plus a time N corresponding to an amount of time after the start time that the gain of the line of sight is detected (e.g., T2=T(Start)+N), where N is a positive value greater than M (e.g., N>M). The timestamp extractor 703 further determines the transition period based on the determined first timestamp T1 and the determined second timestamp T2.

Figure 8:
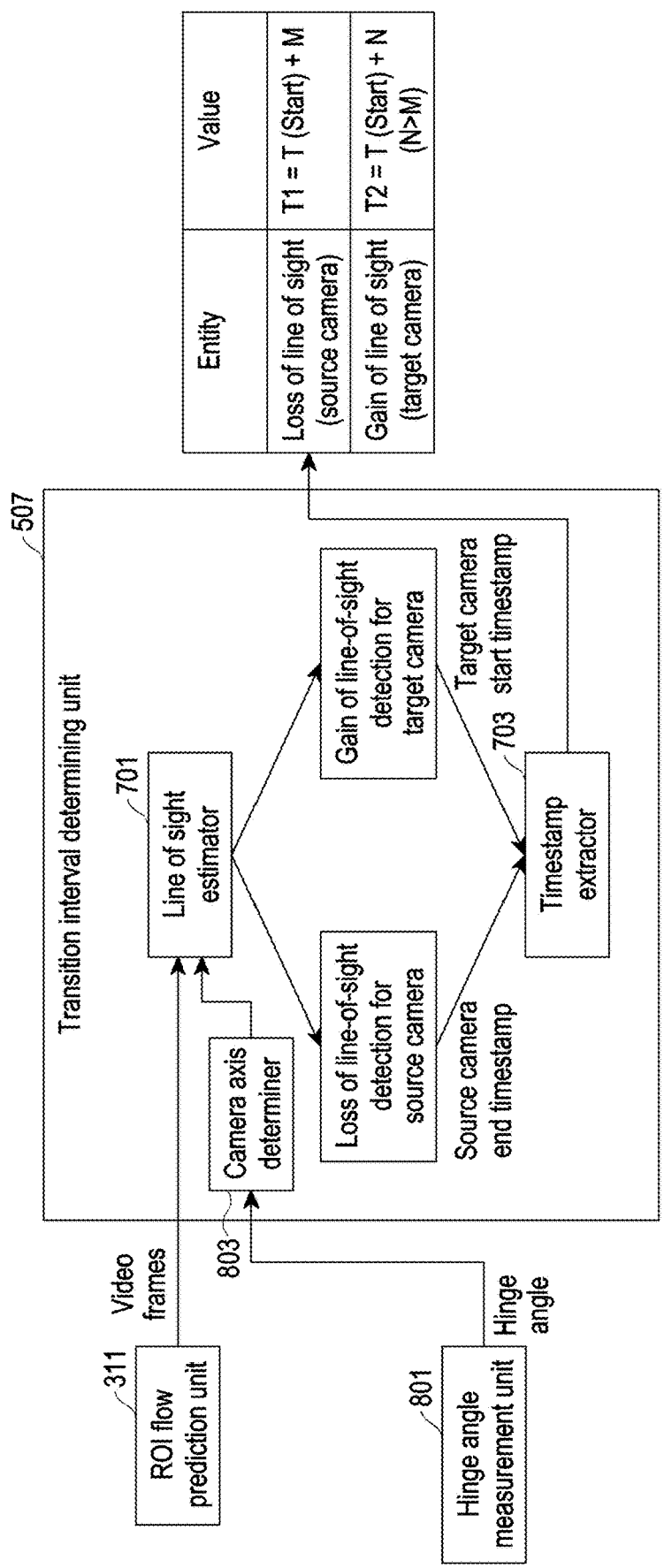
FIG. 8 illustrates a second method for determining the transition period of the foldable device, according to one or more embodiments.

FIG. 8 illustrates a second method for determining the transition period of the foldable device 200, according to one or more embodiments.

According to the second method, the transition interval determining unit 507 includes the line of sight estimator 701, the timestamp extractor 703, and a camera axis determiner 803. The line of sight estimator 701 receives input from the ROI flow prediction unit 311 and a hinge angle measurement unit 801. The hinge angle measurement unit 801 determines a hinge angle of the foldable device 200 during the flex movement. The camera axis determiner 803 determines a camera axis based on the determined hinge angle.

In some embodiments, the line of sight estimator 701 detects the line of sight for the source camera and the line of sight for the target camera based on the determined optical flow and the determined camera axis. For example, the line of sight estimator 701 detects the loss of the line of sight for the source camera and the gain of the line of sight for the target camera. The timestamp extractor 703 determines the first timestamp T1 at which the loss of the line of sight is detected and the second timestamp T2 at which the gain of the line of sight is detected. For example, as shown in FIG. 8, the first timestamp T1 may be equal to the start time plus a time M corresponding to an amount of time after the start time that the loss of the line of sight is detected (e.g., T1=T(Start)+M), where M is a positive value greater than or equal to zero (0). As further shown in FIG. 8, the second timestamp T2 may be equal to the start time plus a time N corresponding to an amount of time after the start time that the gain of the line of sight is detected (e.g., T2=T(Start)+N), where N is a positive value greater than M (e.g., N>M). The timestamp extractor 703 further determines the transition period based on the determined first timestamp T1 and the determined second timestamp T2.

Figure 9:
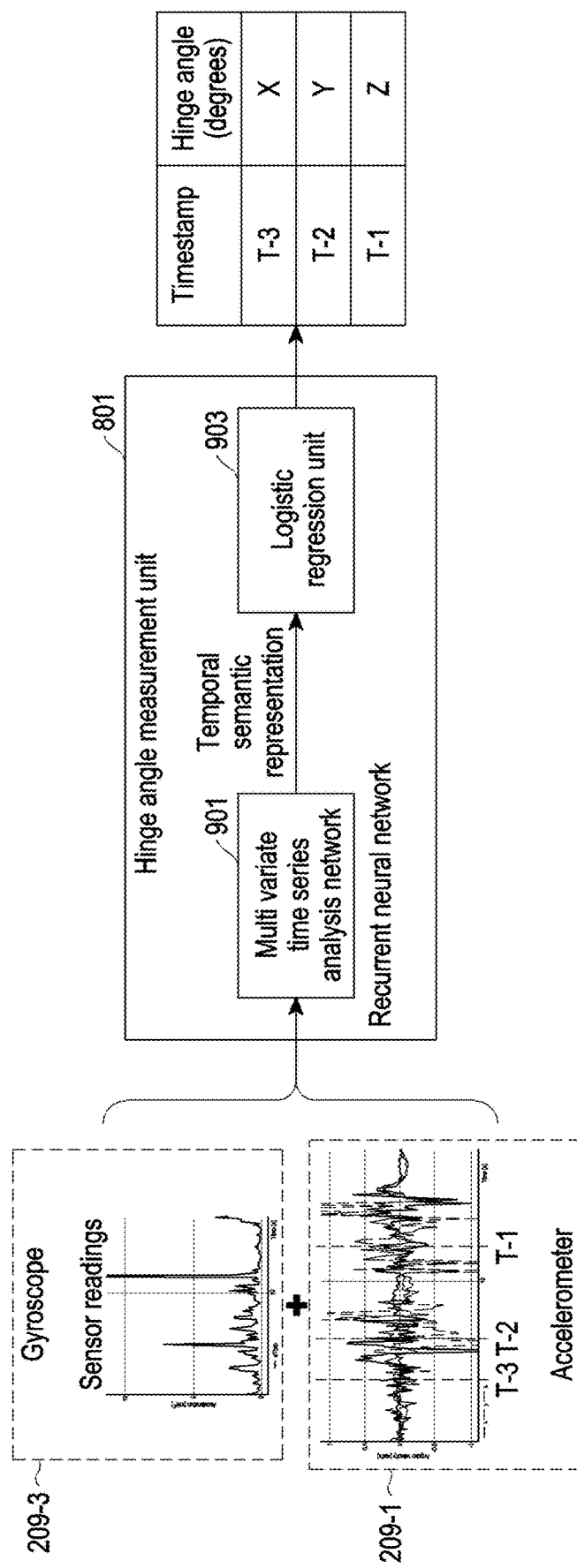
FIG. 9 illustrates a first method for determining a hinge angle of the foldable device, according to one or more embodiments.

FIG. 9 illustrates a first method for determining the hinge angle of the foldable device 200, according to one or more embodiments.

According to the first method, the hinge angle measurement unit 801 includes a multi variate time series analysis network 901 and a logistic regression unit 903. The multi variate time series analysis network 901 receives the sensor data (e.g., the accelerometer data 209-1 and the gyroscope data 209-3). In some embodiments, the multi variate time series analysis network 901 extracts temporal semantic representation of the sensor data at each output timestamp using a fourth ML model. The fourth ML model may be and/or may include a recurrent neural network model. However, the disclosure is not limited in this regard, and the fourth ML model may be and/or may include other types of neural network models.

The logistic regression unit 903 determines the hinge angle at each output timestamp based on the extracted temporal semantic representation of the sensor data. For example, the logistic regression unit 903 may determine the hinge angle using a logistic regression model. As shown in FIG. 9, the logistic regression unit 903 may determine a hinge angle of X degrees for timestamp T-3, a hinge angle of Y degrees for timestamp T-2, and a hinge angle of Z degrees for timestamp T-1. However, the disclosure is not limited in this regard, and the logistic regression unit 903 may determine other hinge angles for the same and/or other timestamps.

Figure 10:
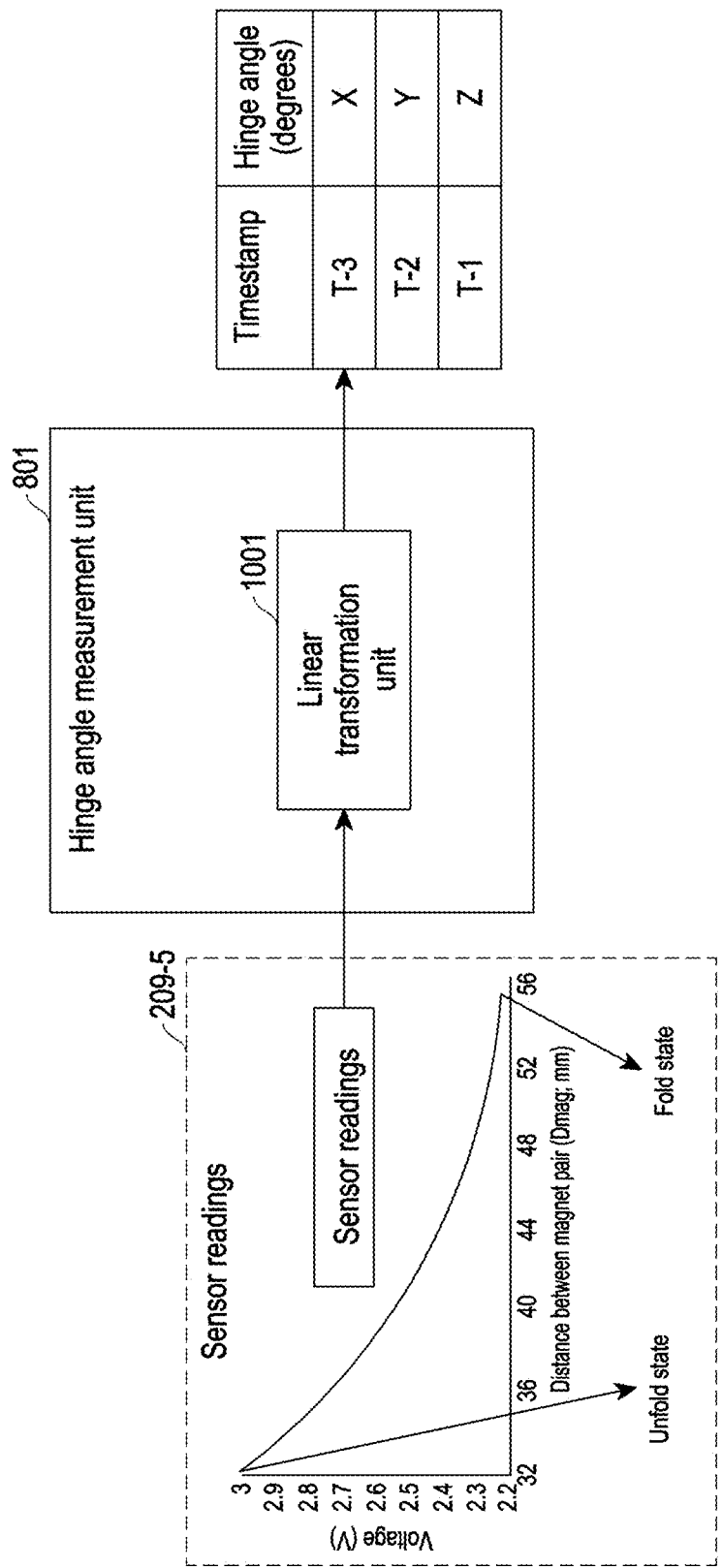
FIG. 10 illustrates a second method for determining the hinge angle of the foldable device, according to one or more embodiments.

FIG. 10 illustrates a second method for determining the hinge angle of the foldable device 200, according to one or more embodiments.

According to the second method, the hinge angle measurement unit 801 includes a linear transformation unit 1001. The linear transformation unit 1001 receives sensor data 209-5 from a Hall effect sensor of the sensor unit 209. The Hall effect sensor generates an output signal proportional to a magnetic flux of a magnet pair on the edges of two displays of the foldable device 200 which are attached to a hinge of the foldable device 200. The linear transformation unit 1001 determines the hinge angle based on the output signal using a linear transformation. For example, the linear transformation unit 1001 may determine a hinge angle of X degrees for timestamp T-3, a hinge angle of Y degrees for timestamp T-2, and a hinge angle of Z degrees for timestamp T-1. However, the disclosure is not limited in this regard, and the linear transformation unit 1001 may determine other hinge angles for the same and/or other timestamps.

Figure 11:
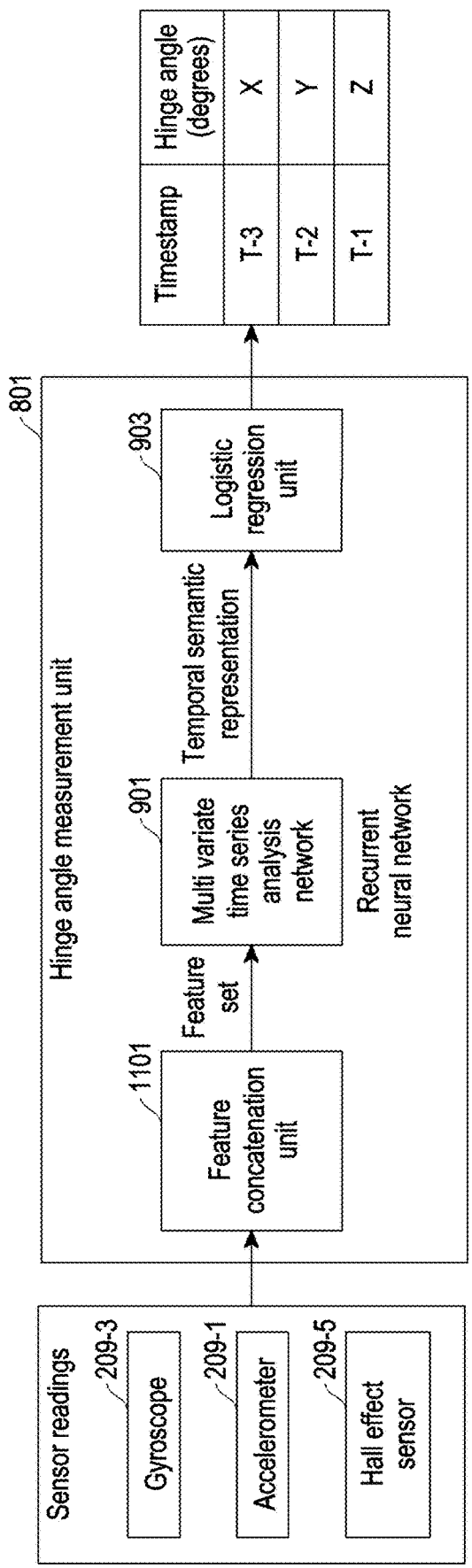
FIG. 11 illustrates a third method for determining the hinge angle of the foldable device, according to one or more embodiments.

FIG. 11 illustrates a third method for determining the hinge angle of the foldable device 200, according to one or more embodiments.

According to the third method, the hinge angle measurement unit 801 includes a feature concatenation unit 1101, the multi variate time series analysis network 901, and the logistic regression unit 903. The feature concatenation unit 1101 receives the sensor data (e.g., the accelerometer data 209-1, the gyroscope data 209-3, and the Hall effect sensor data 209-5). In some embodiments, the feature concatenation unit 1101 extracts a feature set from the received sensor data.

In some embodiments, the multi variate time series analysis network 901 extracts temporal semantic representation of the feature set of the sensor data at each output timestamp using the fourth ML model. In some embodiments, the logistic regression unit 903 determines the hinge angle at each output timestamp based on the extracted temporal semantic representation. For example, the logistic regression unit 903 may determine the hinge angle using the logistic regression model. For example, the logistic regression unit 903 may determine a hinge angle of X degrees for timestamp T-3, a hinge angle of Y degrees for timestamp T-2, and a hinge angle of Z degrees for timestamp T-1. However, the disclosure is not limited in this regard, and the logistic regression unit 903 may determine other hinge angles for the same and/or other timestamps.

In the third method, the sensor data from each of the accelerometer data 209-1, the gyroscope data 209-3, and the Hall effect sensor data 209-5 are used to get a better estimate of the hinge angle by reducing the false error rate in the estimation of the hinge angle.

Figure 12:
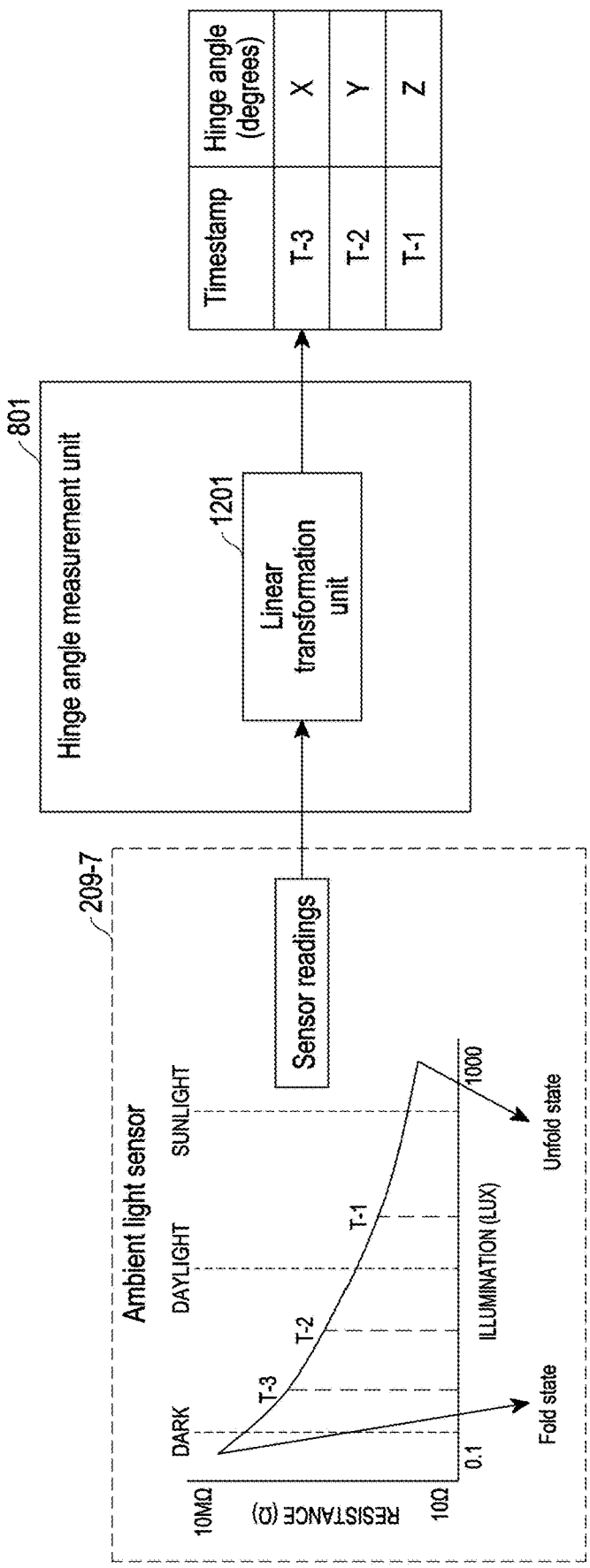
FIG. 12 illustrates a fourth method for determining the hinge angle of the foldable device, according to one or more embodiments.

FIG. 12 illustrates a fourth method for determining the hinge angle of the foldable device 200, according to one or more embodiments.

According to the fourth method, the hinge angle measurement unit 801 includes a linear transformation unit 1201. The linear transformation unit 1201 receives the sensor data 209-7 from an ambient light sensor of the sensor unit 209. The ambient light sensor generates an output signal proportional to an illumination intensity of light. The linear transformation unit 1201 determines the hinge angle based on the output signal using a linear transformation. For example, the linear transformation unit 1201 may determine a hinge angle of X degrees for timestamp T-3, a hinge angle of Y degrees for timestamp T-2, and a hinge angle of Z degrees for timestamp T-1. However, the disclosure is not limited in this regard, and the linear transformation unit 1201 may determine other hinge angles for the same and/or other timestamps.

Figure 13:
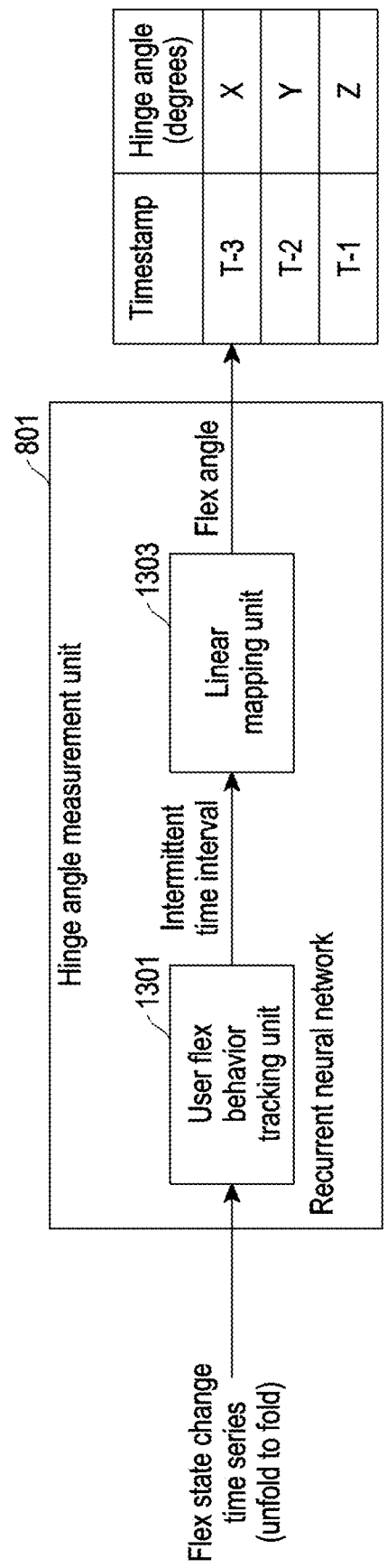
FIG. 13 illustrates a fifth method for determining the hinge angle of the foldable device, according to one or more embodiments.

FIG. 13 illustrates a fifth method for determining the hinge angle of the foldable device 200, according to one or more embodiments.

According to the fifth method, the hinge angle measurement unit 801 includes a user flex behavior tracking unit 1301 and a linear mapping unit 1303. The user flex behavior tracking unit 1301 determines an intermittent time interval taken by a user associated with the foldable device 200 in performing the flex-state transition by tracking user flexing dynamics behavior. The linear mapping unit 1303 determines the hinge angle based on a mapping of the intermittent time interval with the hinge angle. For example, the linear mapping unit 1303 may determine a hinge angle of X degrees for timestamp T-3, a hinge angle of Y degrees for timestamp T-2, and a hinge angle of Z degrees for timestamp T-1. However, the disclosure is not limited in this regard, and the linear mapping unit 1303 may determine other hinge angles for the same and/or other timestamps.

Figure 14:
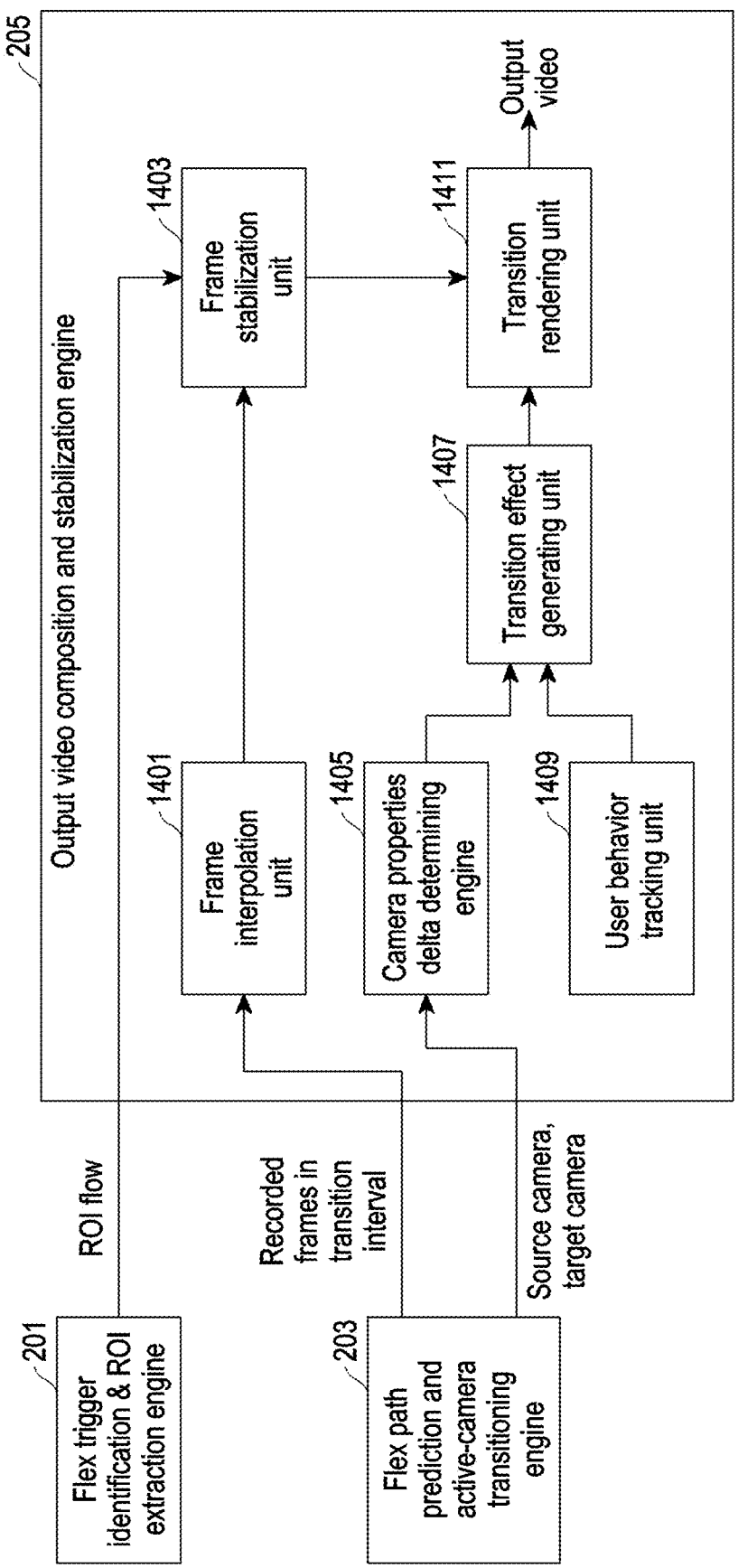
FIG. 14 illustrates a block diagram of an output video composition and stabilization engine of the foldable device, according to one or more embodiments.

FIG. 14 illustrates a block diagram of the output video composition and stabilization engine 205 of the foldable device 200, according to one or more embodiments.

The output video composition and stabilization engine 205 includes a frame interpolation unit 1401, a frame stabilization unit 1403, a camera properties delta determining engine 1405, a transition effect generating unit 1407, a user behavior tracking unit 1409, and a transition rendering unit 1411.

The frame interpolation unit 1401 receives the subsequent one or more frames recorded in the transition interval from the flex path prediction and active-camera transitioning engine 203. In some embodiments, the frame interpolation unit 1401 integrates the subsequent one or more frames captured by the source camera and the target camera in the transition period to form the plurality of target frames.

The frame stabilization unit 1403 receives the optical flow of each of the ROIs from the flex trigger identification & ROI extraction engine 201. In some embodiments, the frame stabilization unit 1403 corrects the position of each of the ROIs in the plurality of target frames. In some embodiments, the frame stabilization unit 1403 eliminates the destabilization that is induced during the flex movement based on the corrected position of each of the ROIs.

The transition effect generating unit 1407 identifies the desirable transition effect based on a shifting of camera parameters, semantic context of the semantic scene being captured, and a user preference for transition effect type.

The shifting of camera parameters is due to a change in the lens during flex movement. The shifting of camera parameters is determined by the camera properties delta determining engine 1405. In some embodiments, the user preference for transition effect type is determined by the user behavior tracking unit 1409.

The transition rendering unit 1411 composites a final frame by blending the identified transition effect in the transition period and consolidating each of the plurality of target frames to generate an output video.

Figure 15:
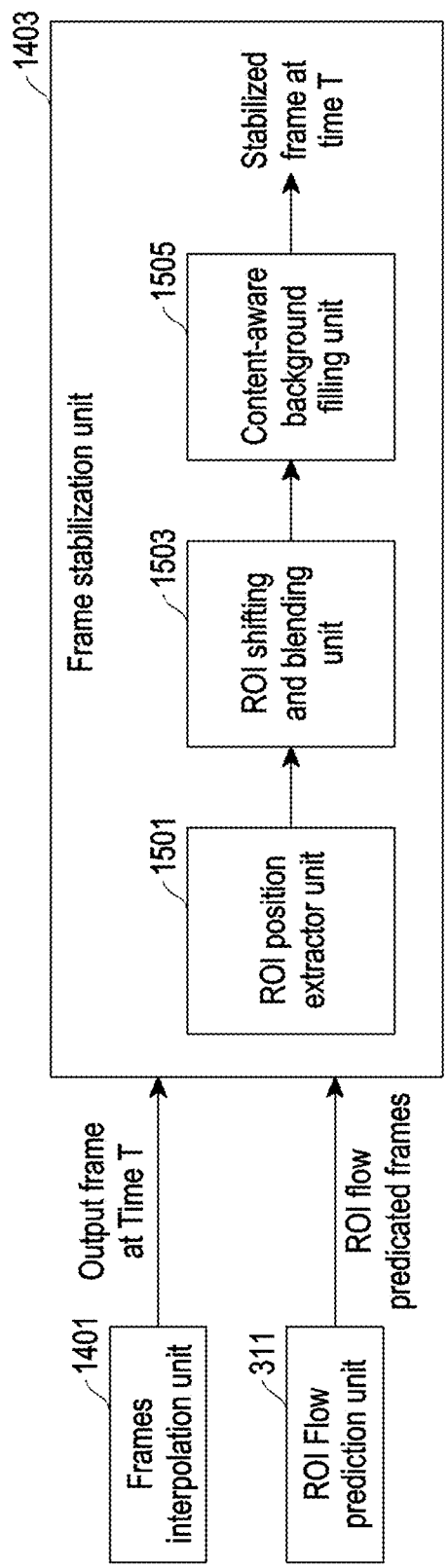
FIG. 15 illustrates a block diagram of a frame stabilization unit of the output video composition and stabilization engine of the foldable device, according to one or more embodiments.

FIG. 15 illustrates a block diagram of the frame stabilization unit 1403 of the output video composition and stabilization engine 205 of the foldable device 200, according to one or more embodiments.

The frame stabilization unit 1403 includes an ROI position extractor unit 1501, an ROI shifting and blending unit 1503, and a content-aware background filling unit 1505.

The ROI position extractor unit 1501 receives the output frame at time T from the frame interpolation unit 1401 and the optical flow for each of the ROIs from the ROI flow prediction unit 311. In some embodiments, the ROI position extractor unit 1501 extracts the position of each of the ROIs in the output frame at time T.

The ROI shifting and blending unit 1503 shifts the position of the ROIs in the output frame at the time T. The content-aware background filling unit 1505 fills the background of the output frame at the time T to output a stabilized frame at the time T and to make the natural motion of the ROIs smooth.

Figure 16:
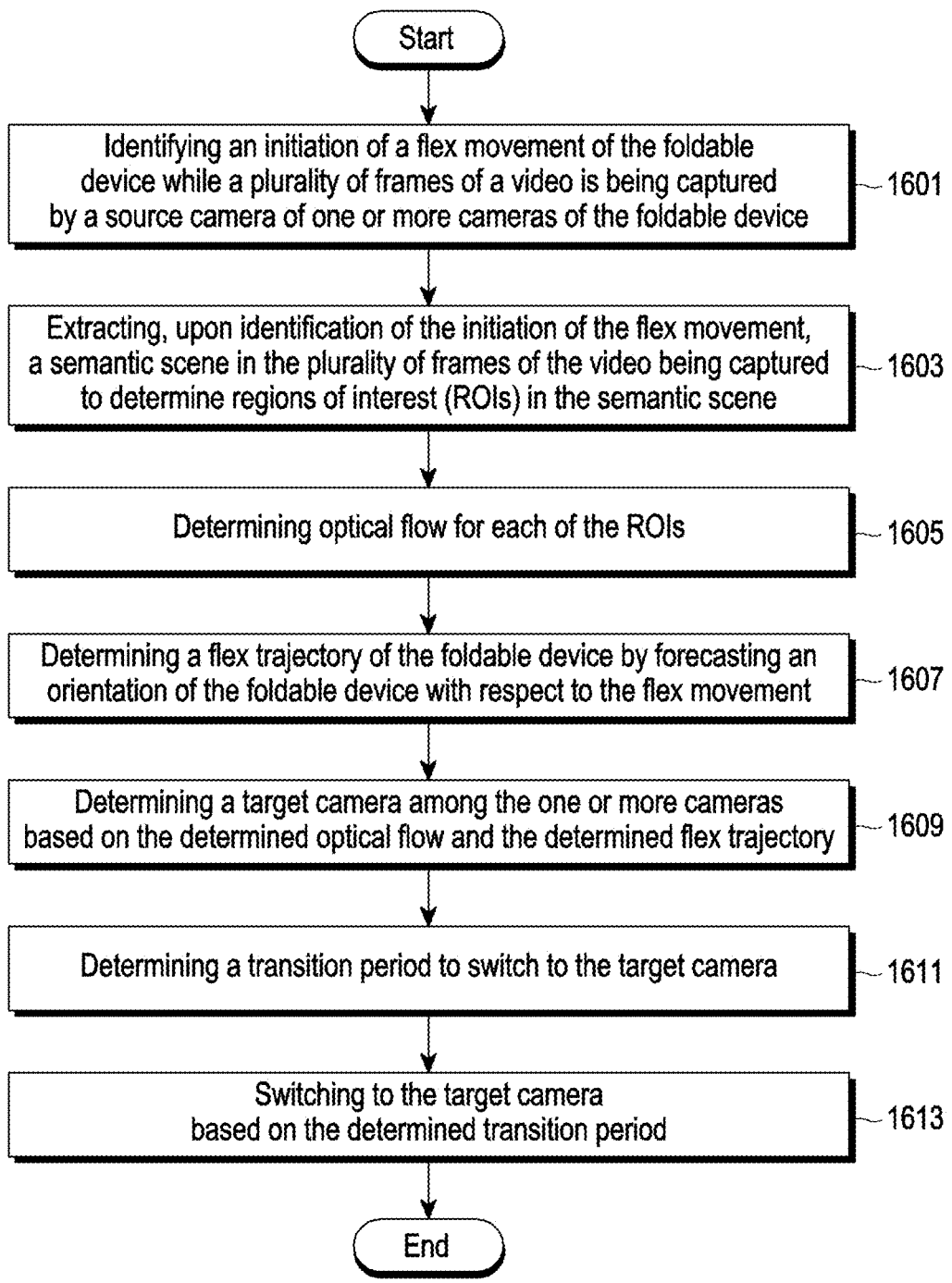
FIG. 16 illustrates a flow chart of a method for seamless video capture during the flex-state transition in the foldable device, according to one or more embodiments.

FIG. 16 illustrates a flow chart of a method 1600 for seamless video capture during flex-state transition in the foldable device 200, according to one or more embodiments. The method 1600 includes a series of operations 1601 through 1613.

At operation 1601, the one or more sensors identify the initiation of the flex movement of the foldable device 200 while the plurality of frames of the video is being captured by the source camera of the one or more cameras of the foldable device 200.

At operation 1603, the scene understanding unit 307 extracts the semantic scene in the plurality of frames of the video being captured to determine ROIs in the semantic scene. The scene understanding unit 307 may extract the semantic scene upon identification of the initiation of the flex movement.

At operation 1605, the ROI flow prediction unit 311 determines the optical flow for each of the ROIs which encodes the natural motion of the ROIs in the subsequent one or more frames. For example, the ROI flow prediction unit 311 may determine the optical flow using the convolutional LSTM encoder-decoder network.

At operation 1607, the flex trajectory prediction unit 501 determines the flex trajectory of the foldable device 200 by forecasting the orientation of the foldable device 200 with respect to the flex movement. For example, the flex trajectory prediction unit 501 forecasts the orientation of the foldable device 200 based on past orientation data (e.g., the gyroscope data 209-3) and the determined type of the flex movement. The flex trajectory prediction unit 501 may forecast the orientation of the foldable device 200 using the LSTM model.

At operation 1609, the target camera determining unit 503 determines the target camera among the one or more cameras based on the determined optical flow and the determined flex trajectory. The target camera determining unit 503 may determine the target camera that has the line of sight equal to the predetermined line of sight at the final device orientation.

At operation 1611, the transition interval determining unit 507 determines the transition period to switch to the target camera.

At operation 1613, the transition rendering unit 1411 switches from displaying at least one frame captured by the source camera to displaying at least one frame captured by the target camera based on the determined transition period.

Figure 17:
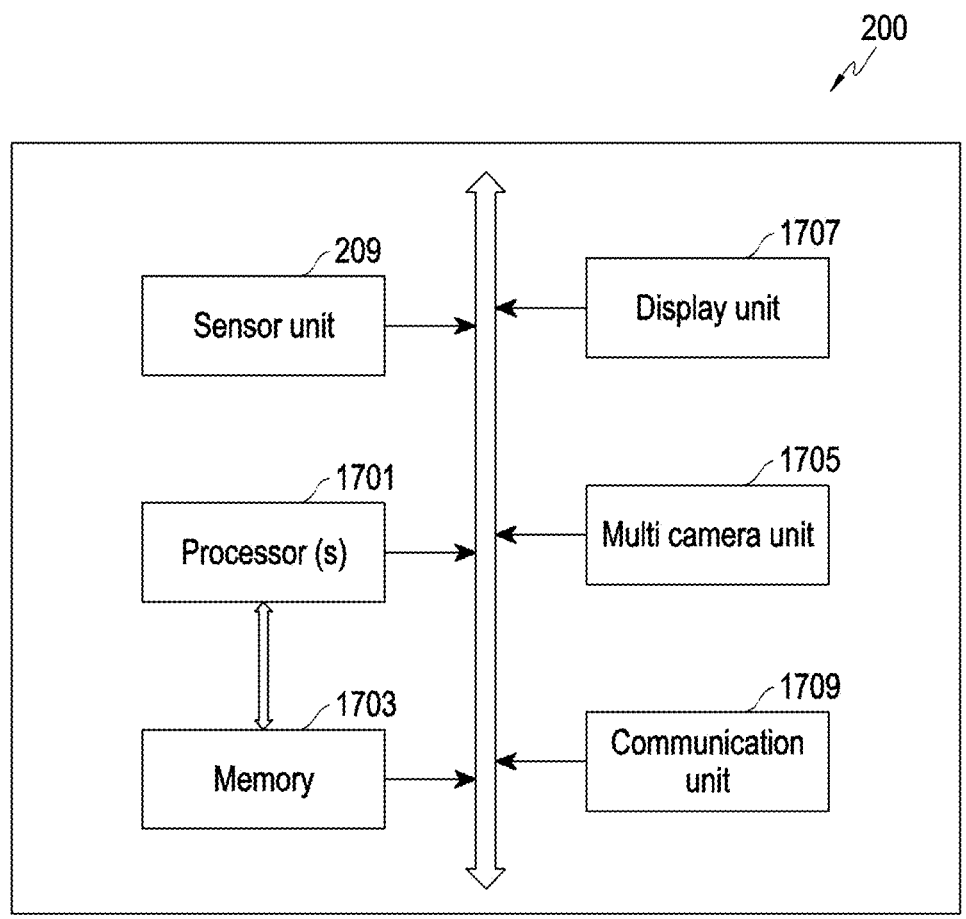
FIG. 17 illustrates a hardware configuration of the foldable device for performing seamless video capture during the flex-state transition, according to one or more embodiments.

FIG. 17 illustrates a hardware configuration of the foldable device 200 for performing seamless video capture during the flex-state transition, according to one or more embodiments.

The foldable device 200 includes the sensor unit 209, a processor 1701, a memory 1703, a multi camera unit 1705, a display unit 1707, and a communication unit 1709.

The sensor unit 209 may be and/or may include the one or more sensors configured to capture data associated with the foldable device 200. The one or more sensors may include, but not be limited to, an accelerometer, a gyroscope, a Hall effect sensor, an ambient light sensor, and the like.

The gyroscope measures and detects the rotational motion of the foldable device 200. The accelerometer detects and measures linear acceleration or changes in velocity along different axes. The Hall effect sensor generates an output signal proportional to the magnetic flux of the magnet pair which are on the edges of two displays of the foldable device 200. The ambient light sensor generates the output signal proportional to the illumination intensity of light. The gyroscope may be and/or may include, but not be limited, a mechanical gyroscope, a microelectromechanical systems (MEMS) gyroscope, and the like. The accelerometer may be and/or may include, but not be limited to, a MEMS accelerometer, a capacitive accelerometer, a piezoresistive accelerometer, and the like.

The processor 1701 may be and/or may include a single processing unit or several units, all of which could include multiple computing units. The processor 1701 may be implemented as one or more microprocessors, microcomputers, microcontrollers, digital signal processors, central processing units, state machines, logic circuitries, and/or any devices that manipulate signals based on operational instructions. Among other capabilities, the processor 1701 is configured to fetch and execute computer-readable instructions and data stored in the memory 1703.

The memory 1703 includes one or more computer-readable storage media. The memory 1703 may be and/or may include non-volatile storage elements. Examples of such non-volatile storage elements may include, but not be limited to, magnetic hard disks, optical discs, floppy disks, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in random access memory (RAM) or cache).

The memory 1703 may further include any non-transitory computer-readable medium known in the art including, for example, volatile memory, such as, but not limited to, static random-access memory (SRAM) and dynamic random-access memory (DRAM), and/or non-volatile memory, such as, but not limited to, read-only memory (ROM), erasable programmable ROM, flash memories, hard disks, optical disks, and magnetic tapes.

The multi camera unit 1705 includes one or more cameras configured to capture a plurality of frames of a video. The one or more cameras may include a front in-display camera, a front cover screen camera, and a rear camera. The multi camera unit 1705 includes the input video recording unit 207.

The display unit 1707 is configured to display the live video the user captured by the multi camera unit 1705 of the foldable device 200. The display unit 1707 may be and/or may include a display screen. As a non-limiting example, the display screen may be and/or may include a light emitting diode (LED), a liquid crystal display (LCD), an organic light emitting diode (OLED), an active matrix organic light emitting diode (AMOLED), a super active matrix organic light emitting diode (AMOLED) screen, and the like. In some embodiments, the display screen may be and/or may be configured to have varied resolutions.

The communication unit 1709 is configured to communicate voice, video, audio, images, or any other digital media content over a communication network. In some embodiments, the communication unit 1709 may include a communication port or a communication interface for sending and receiving notifications from the foldable device 200 via the communication network. The communication port or the communication interface may be a part of a processing unit or may be a separate component. The communication port may be created in software or may be a physical connection in hardware. The communication port may be configured to connect with the communication network, external media, the display unit 1707, or any other components in the foldable device 200, or combinations thereof. The connection with the communication network may be a physical connection, such as, but not limited to, a wired Ethernet connection, or may be established wirelessly as discussed above. Likewise, the additional connections with other components of the electronic device may be physical or may be established wirelessly.

In some embodiments, any of the first ML model, the second ML model, the third ML model, or the fourth ML model described herein may be implemented with an artificial intelligence (AI) module that may include a plurality of neural network layers. Examples of neural networks include, but are not limited to, convolutional neural network (CNN), deep neural network (DNN), recurrent neural network (RNN), and Restricted Boltzmann Machine (RBM). The learning technique may refer to a method for training a predetermined target device (e.g., a foldable device) using a plurality of learning data to cause, allow, or control the foldable device 200 to decide or predict. Examples of learning techniques include, but are not limited to supervised learning, unsupervised learning, semi-supervised learning, or reinforcement learning. At least one of a plurality of CNN, DNN, RNN, RBM models, and the like may be implemented to thereby achieve execution of at least one embodiment of the disclosure through an AI model. A function associated with AI may be performed through the non-volatile memory, the volatile memory, and the processor.

In an embodiment, the modules, units, and/or models may include a program, a subroutine, a portion of a program, a software component, or a hardware component capable of performing a stated task or function. As used herein, the modules, the units, and/or models may be implemented on a hardware component such as, but not limited to, a server independently of other modules, a module that may exist with other modules on the same server, and/or within the same program. The modules, units, and/or models may be implemented on a hardware component such as, but not limited to, processor one or more microprocessors, microcomputers, microcontrollers, digital signal processors, central processing units, state machines, logic circuitries, and/or any devices that manipulate signals based on operational instructions. The modules, units, and/or models, when executed by the processor, may be configured to perform any of the described functionalities.

The methods in one or more embodiments provide various technical benefits and advantages. The technical benefits and advantages include providing a dynamic solution that solves issues.

The various actions, acts, blocks, steps, or the like in the flow diagrams may be performed in the order presented, in a different order, or simultaneously. In some embodiments, some of the actions, acts, blocks, steps, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may be combined into a single functional element. Alternatively or additionally, certain elements may be split into multiple functional elements. As another example, elements from one embodiment may be added to another embodiment.

The embodiments may be implemented using at least one hardware device and performing network management functions to control the elements.

The foregoing description of the specific embodiments may reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the scope of the embodiments as described herein.

What is claimed is:

1. A method for seamless video capture in a foldable device, the method comprising:
    identifying, by one or more sensors of the foldable device, an initiation of a flex movement of the foldable device for flex-state transition based on a plurality of frames of a video being captured by a source camera from among one or more cameras;
    extracting, based on the identifying of the initiation of the flex movement, a semantic scene from the plurality of frames of the video to determine one or more regions of interest (ROIs);
    determining an optical flow for each of the one or more ROIs which encodes a motion of ROIs in subsequent frames of the plurality of frames;
    determining a flex trajectory of the foldable device by forecasting an orientation of the foldable device with respect to the flex movement;
    determining a target camera from among the one or more cameras, based on the optical flows and the flex trajectory of the foldable device;
    determining a transition period to switch to the target camera; and
    switching from displaying at least one frame captured by the source camera to displaying at least one frame captured by the target camera, based on the transition period.

2. The method of claim 1, further comprising:
    receiving, from the one or more sensors, sensor data and information corresponding to the flex movement, the sensor data comprising at least one of gyroscope data and accelerometer data; and
    determining a type of the flex movement based on the sensor data,
    wherein the determining of the flex trajectory of the foldable device comprises:
        forecasting, using a machine learning model, the orientation of the foldable device based on the sensor data and the type of the flex movement; and
        determining the flex trajectory of the foldable device based on the orientation of the foldable device.

3. The method of claim 1, wherein the one or more ROIs comprises at least one of:

one or more persons that are present in the semantic scene; and one or more objects that are present in the semantic scene.

4. The method of claim 1, wherein the determining of the optical flow for each of the one or more ROIs comprises:

determining, using a machine learning model, the optical flow for each of the one or more ROIs in the subsequent frames of the plurality of frames, based on frames captured by the source camera prior to the identifying of the initiation of the flex movement.

5. The method of claim 1, wherein the determining of the target camera comprises:

receiving, from the one or more cameras, position information of the one or more cameras;

determining, based on the flex trajectory, a final orientation of the foldable device corresponding to a completion of the flex-state transition; and determining based on the optical flow and the position information, the target camera, the target camera having a final line of sight equal to a predetermined line of sight at the final orientation.

6. The method of claim 5, wherein the determining of the transition period comprises:

detecting a first line of sight of the source camera and a second line of sight of the target camera, based on the optical flow and the flex trajectory;

determining a first timestamp based on detecting a loss of the first line of sight of the source camera;

determining a second timestamp based on detecting a gain of the second line of sight of the target camera; and determining the transition period based on the first timestamp and the second timestamp.

7. The method of claim 5, further comprising:

determining a hinge angle of the foldable device during the flex movement, wherein the determining of the transition period comprises:

detecting a first line of sight of the source camera and a second line of sight of the target camera, based on the optical flow and the hinge angle;

determining a first timestamp based on detecting a loss of the first line of sight of the source camera;

determining a second timestamp based on detecting a gain of the second line of sight of the target camera; and determining the transition period based on the first timestamp and the second timestamp.

8. The method of claim 7, wherein the determining of the hinge angle of the foldable device comprises:

extracting, using a machine learning model, temporal semantic representation of sensor data of the one or more sensors at each output timestamp; and determining, using a logistic regression model, the hinge angle at each output timestamp based on the temporal semantic representation of the sensor data.

9. The method of claim 7, wherein the determining of the hinge angle of the foldable device comprises:

generating, using a Hall effect sensor, an output signal proportional to a magnetic flux of a magnet pair on edges of two displays of the foldable device that are attached to a hinge of the foldable device; and determining, using a linear mapping, the hinge angle based on the output signal.

10. The method of claim 7, wherein the determining of the hinge angle of the foldable device comprises determining the hinge angle based on sensor data of the one or more sensors and an output of a Hall effect sensor.

11. The method of claim 7, wherein the determining of the hinge angle of the foldable device comprises:

generating, using an ambient light sensor, an output signal proportional to an illumination intensity of light; and determining, using a linear mapping, the hinge angle based on the output signal.

12. The method of claim 7, wherein the determining of the hinge angle of the foldable device comprises:

determining an intermittent time interval taken by a user associated with the foldable device in performing the flex-state transition by tracking user flexing dynamics behavior; and determining the hinge angle based on a mapping of the intermittent time interval with the hinge angle.

13. The method of claim 1, further comprising:

integrating the subsequent frames captured by the source camera and the target camera in the transition period to form a plurality of target frames;

correcting a position of each of the one or more ROIs in the plurality of target frames;

eliminating, based on the corrected position of each of the one or more ROIs in the plurality of target frames, destabilization induced during the flex movement;

identifying a transition effect based on a shifting of camera parameters, semantic context of the semantic scene being captured, and a user preference for transition effect type; and compositing a final frame by blending the transition effect in the transition period and consolidating each of the plurality of target frames to generate an output video.

14. A foldable device, comprising:

one or more cameras;

one or more sensors configured to identify an initiation of a flex movement of the foldable device for flex-state transition based on a plurality of frames of a video being captured by a source camera from among the one or more cameras;

a memory storing instructions; and one or more processors communicatively coupled to the memory, wherein the one or more processors are configured to execute the instructions to:

extract, based on identification of the initiation of the flex movement, a semantic scene in the plurality of frames of the video to determine one or more regions of interest (ROIs);

determine an optical flow for each of the one or more ROIs, which encodes a motion of ROIs in subsequent frames of the plurality of frames;

determine a flex trajectory of the foldable device by forecasting an orientation of the foldable device with respect to the flex movement;

determine a target camera from among the one or more cameras, based on the optical flows and the flex trajectory of the foldable device;

determine a transition period to switch to the target camera; and switch from displaying at least one frame captured by the source camera to displaying at least one frame captured by the target camera based on the transition period.

15. The foldable device of claim 14, wherein the one or more processors are further configured to execute the instructions to:

receive, from the one or more sensors, sensor data and information corresponding to the flex movement, the sensor data comprising at least one of gyroscope data and accelerometer data; and determine a type of the flex movement based on the sensor data, forecast, using a machine learning model, the orientation of the foldable device based on the sensor data and the type of the flex movement; and determine the flex trajectory of the foldable device based on the orientation of the foldable device.

16. The foldable device of claim 14, wherein the one or more ROIs comprises at least one of:

one or more persons that are present in the semantic scene; and one or more objects that are present in the semantic scene.

17. The foldable device of claim 14, wherein the one or more processors are further configured to execute the instructions to:

determine, using a machine learning model, the optical flow for each of the one or more ROIs in the subsequent frames of the plurality of frames, based on frames captured by the source camera prior to the identifying of the initiation of the flex movement.

18. The foldable device of claim 14, wherein the one or more processors are further configured to execute the instructions to:

receive, from the one or more cameras, position information of the one or more cameras;

determine, based on the flex trajectory, a final orientation of the foldable device corresponding to a completion of the flex-state transition; and determine, based on the optical flow and the position information, the target camera, the target camera having a final line of sight equal to a predetermined line of sight at the final orientation.

19. The foldable device of claim 14, wherein the one or more processors are further configured to execute the instructions to:

integrate the subsequent frames that are captured by the source camera and the target camera in the transition period to form a plurality of target frames;

correct a position of each of the one or more ROIs in the plurality of target frames;

eliminate, based on the corrected position of each of the one or more ROIs in the plurality of target frames, destabilization induced during the flex movement;

identify a transition effect based on a shifting of camera parameters, semantic context of the semantic scene being captured, and a user preference for transition effect type; and composite a final frame by blending the transition effect in the transition period and consolidating each of the plurality of target frames to generate an output video.

20. One or more non-transitory computer readable storage media storing computer-executable instructions that, when executed by at least one processor of a foldable device, causes the foldable device to perform operations, the operations comprising:

identify an initiation of a flex movement of the foldable device based on a plurality of frames of a video being captured by a source camera from among one or more cameras of the foldable device;

extract, based on identification of the initiation of the flex movement, a semantic scene in the plurality of frames of the video to determine one or more regions of interest (ROIs);

determine an optical flow for each of the one or more ROIs, which encodes a motion of ROIs in subsequent frames of the plurality of frames;

determine a flex trajectory of the foldable device by forecasting an orientation of the foldable device with respect to the flex movement;

determine a target camera from among the one or more cameras, based on the optical flows and the flex trajectory of the foldable device;

determine a transition period to switch to the target camera; and switch from displaying at least one frame captured by the source camera to displaying at least one frame captured by the target camera based on the transition period.

* * * * *